United States Patent
Lin

[11] Patent Number: 5,845,962
[45] Date of Patent: Dec. 8, 1998

[54] FOLDABLE CHAIR

[75] Inventor: Fang-Sheng Lin, Yong Kang, Taiwan

[73] Assignee: Forever Young Enterprise Co., Ltd., Taipei, Taiwan

[21] Appl. No.: 823,531

[22] Filed: Mar. 24, 1997

[51] Int. Cl.⁶ .................... A47C 4/22; A47D 1/02
[52] U.S. Cl. ............... 297/54; 297/51; 297/16.1; 297/440.24; 248/188; 248/188.6; 248/439; 403/100; 403/102; 403/205
[58] Field of Search .......... 297/54, 51, 440.24, 297/423.45, 16.1; 403/102, 100, 205, 382; 248/188.6, 188, 439

[56] References Cited

U.S. PATENT DOCUMENTS

| | | | |
|---|---|---|---|
| 2,400,155 | 5/1946 | Letschert et al. | 403/102 X |
| 2,815,801 | 12/1957 | Fingerhut et al. | 248/188 |
| 3,284,136 | 11/1966 | Harrison | 248/188 X |
| 3,396,928 | 8/1968 | Lay | 248/188.6 |
| 3,695,702 | 10/1972 | Ingellis | 297/440.24 |
| 4,174,085 | 11/1979 | Ferreira et al. | 248/188.6 X |
| 4,191,111 | 3/1980 | Emmert | 248/439 X |
| 4,469,377 | 9/1984 | O'Rourke | 297/440.24 X |
| 4,605,261 | 8/1986 | Lee | 297/16.1 X |
| 4,784,436 | 11/1988 | Sutherland | 297/440.24 |
| 4,881,776 | 11/1989 | Wang | 297/440.24 X |
| 5,178,583 | 1/1993 | Rankin | 403/100 X |
| 5,415,455 | 5/1995 | Geldbaugh | 297/54 X |
| 5,435,620 | 7/1995 | Cheng | 297/51 |
| 5,449,220 | 9/1995 | Taylor et al. | 297/16.1 X |
| 5,498,054 | 3/1996 | Tomlinson | 297/440.24 X |

Primary Examiner—Peter M. Cuomo
Assistant Examiner—Rodney B. White
Attorney, Agent, or Firm—Peterson, Wicks, Nemer and Kamrath, P.A.

[57] ABSTRACT

A foldable chair has a seat support, a seat plate disposed on the seat support, a first support pipe disposed beneath the seat support, a second support pipe disposed beneath the first support pipe, a first knuckle connected to a first end of the first support pipe, a second knuckle connected to a second end of the first support pipe, a third knuckle connected to a first end of the second support pipe, a fourth knuckle connected to a second end of the second support pipe, a first leg tube connected to the first knuckle, a second leg tube connected to the second knuckle, a third leg cube connected to the third knuckle, a fourth leg tube connected to the fourth knuckle, a first leg pad connected to the first leg tube, a second leg pad connected to the second leg tube, a third leg pad connected to the third leg tube, a fourth leg pad connected to the fourth leg tube, a fifth knuckle connected to the seat support, a sixth knuckle connected to the seat support, a first spindle connected to the fifth knuckle, a second spindle connected to the sixth knuckle, and a backrest plate disposed on the first spindle and the second spindle.

3 Claims, 4 Drawing Sheets

FOLDABLE CHAIR

BACKGROUND OF THE INVENTION

The invention relates to a foldable chair. More particularly, the invention relates to a foldable chair which is placed in a bathroom.

A conventional bathing chair cannot be folded. Thus the conventional bathing chair occupies a large room in a bathroom.

SUMMARY OF THE INVENTION

An object of the invention is to provide a foldable chair which can be folded in a bathroom while the foldable chair is not used.

Accordingly, a foldable chair comprises a seat support, a seat plate disposed on the seat support, a first support pipe disposed beneath the seat support, a second support pipe disposed beneath the first support pipe, a first knuckle connected to a first end of the first support pipe, a second knuckle connected to a second end of the first support pipe, a third knuckle connected to a first end of the second support pipe, a fourth knuckle connected to a second end of the second support pipe, a first leg tube connected to the first knuckle, a second leg tube connected to the second knuckle, a third leg tube connected to the third knuckle, and a fourth leg tube connected to the fourth knuckle. A plurality of threaded holes are formed on the seat support. Each of the first leg tube, the second leg tube, the third leg tube, and the fourth leg tube has an upper interior to receive a joint pipe, and at last an aperture to receive an elastic plate inserted in the corresponding leg tube. A ring encloses the corresponding joint pipe. A hollow lug is disposed on the corresponding ring. A through hole is formed on the hollow lug. An elbow has an upper end, a lower end, and a rib. A positioning hole is formed on the upper end of the elbow. A slide hole is formed on the rib. The lower end of the elbow is inserted in the corresponding joint pipe. The rib is inserted in the hollow lug. A screw passes through the corresponding through hole, the corresponding slide hole and a nut. The upper end of the elbow is inserted in the corresponding support pipe. A round hole is formed on the corresponding support pipe. A bolt passes through the corresponding round hole and the corresponding positioning hole.

DETAILED DESCRIPTION OF THE INVENTION

Figure 1:
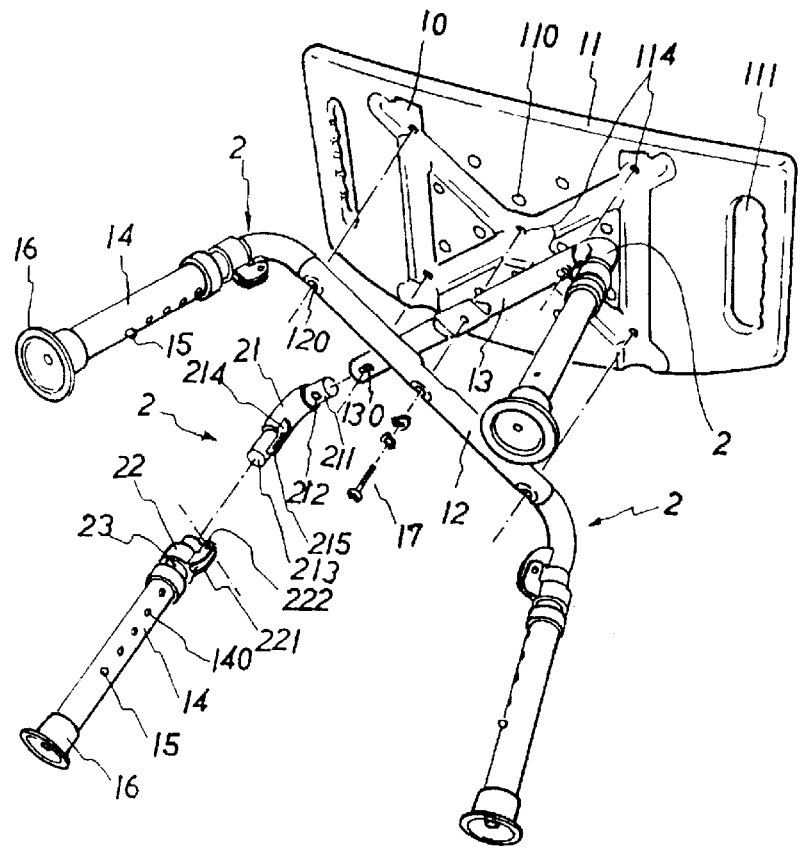
FIG. 1 is a perspective exploded view of a foldable chair off preferred embodiment in accordance with the invention.
Figure 2:
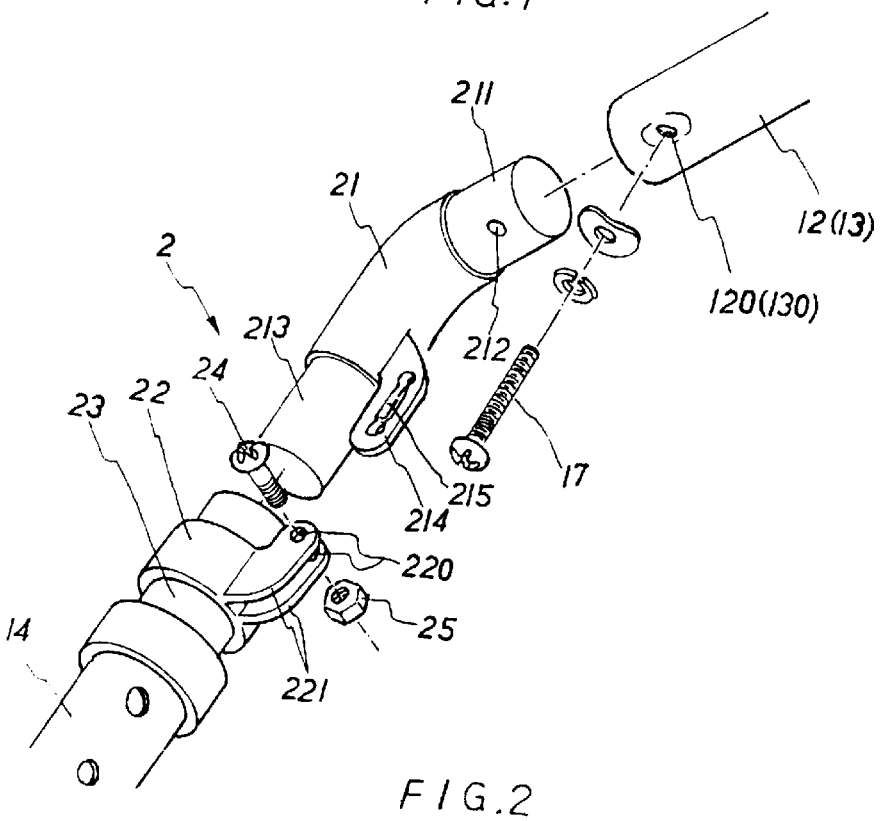
FIGS. 2 is a perspective exploded view of a pipe, a knuckle, and a leg tube.
Figure 3:
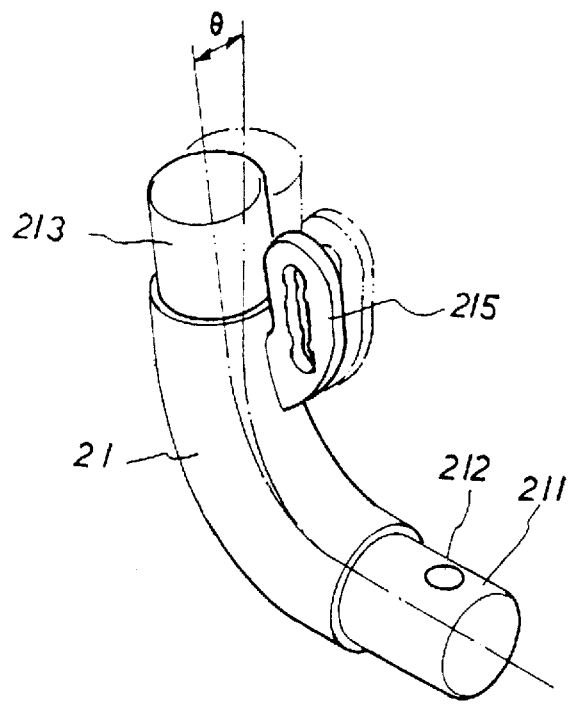
FIG. 3 is a perspective view of a knuckle.
Figure 4:
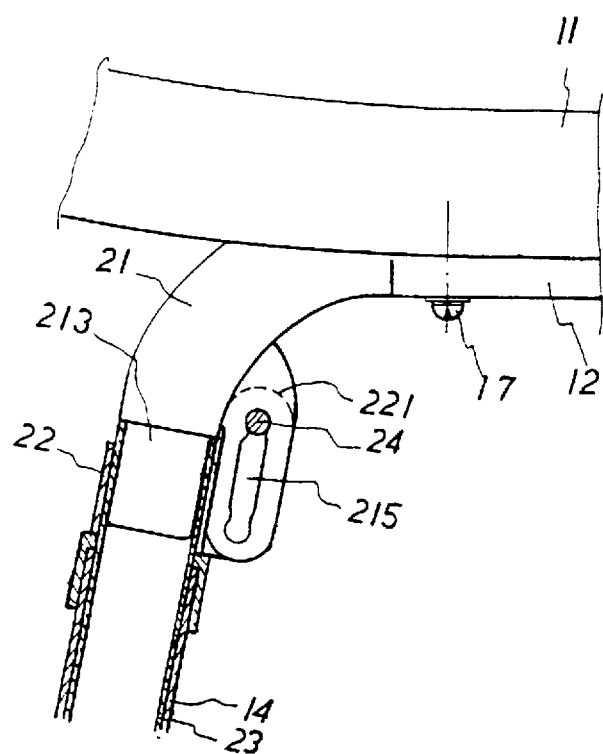
FIG. 4 is a partially sectional view of a pipe and a knuckle

Referring to FIGS. 1 to 4 and 6, a foldable chair comprises a seat support 10, a seat plate 11 disposed on the seat support 10, a first support pipe 13 disposed beneath the seat support 10, a second support pipe 12 disposed beneath the first support pipe 13, a first knuckle 2 connected to a first end of the first support pipe 13, a second knuckle 2 connected to a second end of the first support pipe 13, a third knuckle 2 connected to a first end of the second support pipe 12, a fourth knuckle 2 connected to a second end of the second support pipe 12, a first leg tube 14 connected to the first knuckle 2, a second leg tube 14 connected to the second knuckle 2, a third leg tube 14 connected to the third knuckle 2, a fourth leg tube 14 connected to the fourth knuckle 2, a first leg pad 16 connected to the first leg tube 14, a second leg pad 16 connected to the second leg tube 14, a third leg pad 16 connected to the third leg tube 14, a fourth leg pad 16 connected to the fourth leg tube 14, a fifth knuckle 2 connected to the seat support 10, a sixth knuckle 2 connected to the seat support 10, a first spindle 19 connected to the fifth knuckle 2, a second spindle 19 connected to the sixth knuckle 2, and a backrest plate 18 disposed on the first spindle 19 and the second spindle 19.

A plurality of vent holes 110 are formed on the seat plate 11. Two slots 111 are formed on the seat plate 11.

A plurality of threaded holes 114 are formed on the seat support 10. Each of the first leg tube 14, the second leg tube 14, the third leg tube 14, and the fourth leg tube 14 has an upper interior to receive a joint pipe 23, and at least an aperture 140 to receive an elastic plate 15 which is including in the corresponding each leg tube 14. The elastic plate 15 is a conventional element. The elastic plate 15 positions each respective joint pipe 23 in each respective leg tube 14. A ring 22 is attached to each joint pipe 23. The ring 22 surrounds each joint pipe 23. A hollow lug 221 is disposed on the corresponding ring 22. A through hole 220 is formed on the hollow lug 221. An elbow 21 has an upper end 211, a lower end 213, and a rib 214. A positioning hole 212 is formed on the upper end 211 of the elbow 21. A slide hole 215 is formed on the rib 214. The lower end 213 of the elbow 21 is inserted in the corresponding joint pipe 23. The rib 214 is inserted in the hollow lug 221. A Screw 24 passes through the corresponding through hole 220, the corresponding slide hole 215, and a nut 25. The upper end 211 of the elbow 21 is inserted in the corresponding support pipe 12 or 13. A round hole 120 or 130 is formed on the corresponding support pipe 12 or 13. A bolt 17 passes through the corresponding round hole 120 or 130 and the corresponding positioning hole 212.

Figure 5:
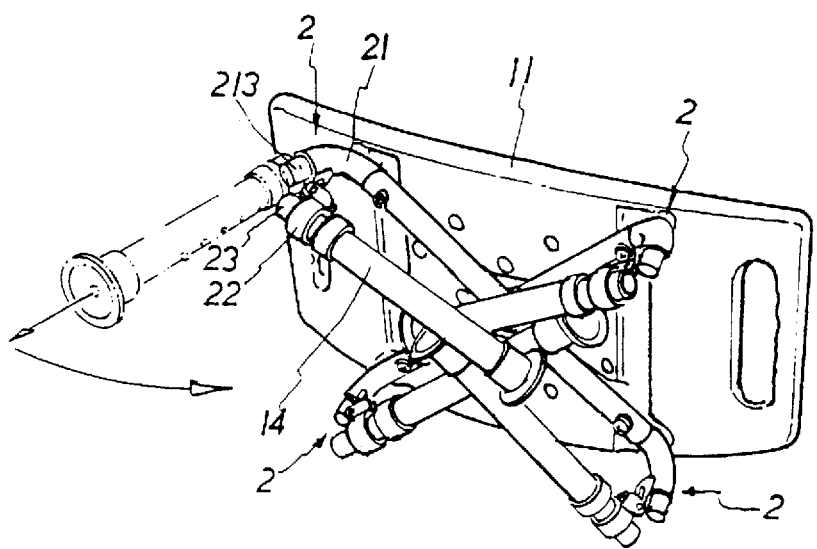
FIG. 5 is a schematic view illustrating a fold of a foldable chair
Figure 6:
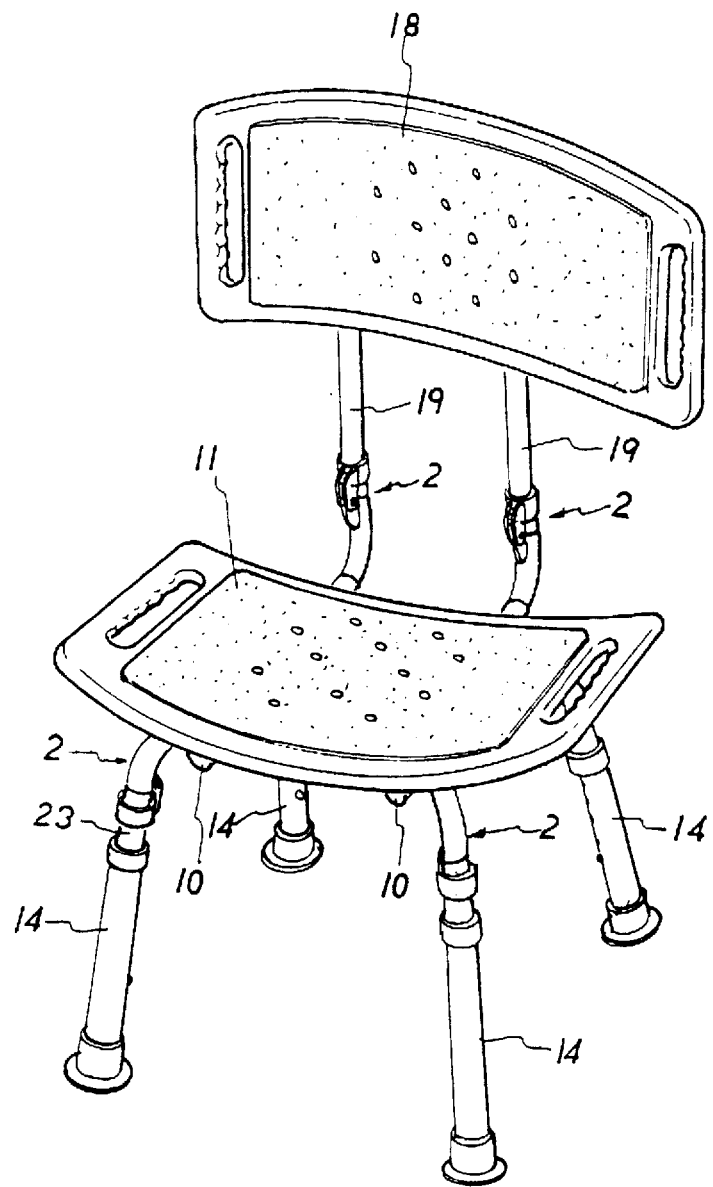
FIG. 6 is a perspective assembly view of a foldable chair of a preferred embodiment in accordance with the invention.

Referring to FIG. 5, the elbow 21 and the corresponding joint pipe 23 can be separated. This the joint pipe 23 is folded under the seat support 10.

The invention is not limited to the above embodiment but various modification thereof may be made. Further, various changes in form and detail may be made without departing from the scope of the invention.

I claim:

1. A foldable chair comprising:
   a seat support, a seat plate disposed on the seat support, a first support pipe disposed beneath the seat support, a second support pipe disposed beneath the first support pipe, a first knuckle connected to a first end of the first support pipe, a second knuckle connected to a second end of the first support pipe, a third knuckle connected to a first end of the second support pipe, a fourth knuckle connected to a second end of the second support pipe, a first leg tube connected to the first knuckle, a second leg tube connected to the second knuckle, a third leg tube connected to the third knuckle, and a fourth leg tube connected to the fourth knuckle,
   a plurality of threaded holes formed on the seat support,
   each of the first leg tube, the second leg tube, the third leg tube, and the fourth leg tube having an upper interior to receive a joint pipe, and at least an aperture to receive an elastic plate inserted in each of the leg tubes, each elastic plate positioning each respective joint pipe in each respective leg tube, a ring attached to each joint pipe, the ring surrounding each joint pipe, a hollow lug disposed on each ring, a through hole formed on the hollow lug, each knuckle comprising an elbow having an upper end, a lower end, and a rib, a positioning hole formed on the upper end of the elbow, a slide hole formed on the rib, the lower end of the elbow inserted in each joint pipe, the rib inserted in the hollow lug, a screw passing through each through hole, each slide hole and a nut, the upper end of the elbow inserted in each support pipe, a round hole formed on each support pipe, and a bolt passing through each round hole and each positioning hole.

2. A foldable chair as claimed in claim 1, wherein a first leg pad is connected to the first leg lube, a second leg pad is connected to the second leg tube, a third leg pad is connected to the third leg tube, and a fourth leg pad is connected to the fourth leg tube.

3. A foldable chair as claimed in claim 1, wherein a fifth knuckle is connected to the seat support, a sixth knuckle is connected to the seat support, a first spindle is connected to the fifth knuckle, a second spindle is connected to the sixth knuckle, and a backrest plate is disposed on the first spindle and the second spindle.

* * * * *